United States Patent
Mehrvar

(10) Patent No.: US 10,750,255 B2
(45) Date of Patent: Aug. 18, 2020

(54) SEGMENT ROUTING FOR OPTICAL NETWORKS

(71) Applicant: Hamid Mehrvar, Ottawa (CA)

(72) Inventor: Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 15/136,378

(22) Filed: Apr. 22, 2016

(65) Prior Publication Data

US 2017/0311056 A1 Oct. 26, 2017

(51) Int. Cl.
*H04Q 11/00* (2006.01)
*H04L 12/721* (2013.01)
(Continued)

(52) U.S. Cl.
CPC ...... *H04Q 11/0005* (2013.01); *H04J 14/0267* (2013.01); *H04L 45/62* (2013.01); *H04L 49/25* (2013.01); *H04Q 11/0066* (2013.01); *H04J 2203/0023* (2013.01); *H04J 2203/0053* (2013.01); *H04Q 2011/002* (2013.01); *H04Q 2011/0009* (2013.01); *H04Q 2011/0015* (2013.01); *H04Q 2011/0039* (2013.01); *H04Q 2011/0041* (2013.01); *H04Q 2011/0069* (2013.01); *H04Q 2011/0073* (2013.01); *H04Q 2011/0088* (2013.01)

(58) Field of Classification Search
USPC ...................................................... 398/45–57
See application file for complete search history.

(56) References Cited

U.S. PATENT DOCUMENTS 5,912,753 A * 6/1999 Cotter .................. H04B 10/299
359/108
6,101,013 A 8/2000 Monacos
(Continued)

FOREIGN PATENT DOCUMENTS

CN 101325560 A 12/2008
CN 102231864 A 11/2011
(Continued)

OTHER PUBLICATIONS

Daniel Dib: "Segment Routing: Potential for Far-Reaching Network Effects", https://www.networkcomputing.com/networking/segment-routing-potential-far-reaching-network-effects/516090694, Jun. 9, 2015.*
(Continued)

*Primary Examiner* — Li Liu

(57) ABSTRACT

Aspects of the disclosure involve a source node, having some predetermined knowledge of the optical network generating a list of nodes and/or optical links between nodes that form a route in the optical network from the source node to the destination node. The nodes in the optical network do not necessarily need to know the entire route from source node to destination node. Each node simply decodes the control information identifying the next hop in the route towards the destination node. By utilizing the decoded control information identifying the next hop, a switch in the node can be controlled to route the optical signal including the payload and some or all of the control information onto the next optical link toward the destination node.

18 Claims, 11 Drawing Sheets

(51) Int. Cl.
*H04J 14/02* (2006.01)
*H04L 12/947* (2013.01)

(56) References Cited

U.S. PATENT DOCUMENTS

| | | | | |
|---|---|---|---|---|
| 6,529,301 | B1* | 3/2003 | Wang | H04Q 11/0005 398/82 |
| 6,657,757 | B1* | 12/2003 | Chang | H04J 14/0227 370/471 |
| 7,272,310 | B2* | 9/2007 | Maciocco | H04Q 11/0066 370/351 |
| 9,319,312 | B2* | 4/2016 | Filsfils | H04L 45/507 |
| 9,462,359 | B2* | 10/2016 | Mehrvar | H04Q 11/0005 |
| 2001/0017866 | A1* | 8/2001 | Takada | H04Q 11/0003 370/535 |
| 2002/0018263 | A1* | 2/2002 | Ge | H04L 49/106 398/87 |
| 2002/0027686 | A1* | 3/2002 | Wada | H04Q 11/0005 398/87 |
| 2003/0133641 | A1* | 7/2003 | Yoo | B82Y 20/00 385/14 |
| 2004/0018016 | A1* | 1/2004 | O'Mahony | H04Q 11/0005 398/43 |
| 2004/0033074 | A1* | 2/2004 | Hsu | H04Q 11/0005 398/51 |
| 2005/0047392 | A1* | 3/2005 | Ashwood Smith | H04L 49/25 370/351 |
| 2005/0175341 | A1* | 8/2005 | Ovadia | H04L 29/06 398/43 |
| 2006/0171386 | A1* | 8/2006 | Hesse | H04L 47/56 370/389 |
| 2012/0275783 | A1 | 11/2012 | Kitajima et al. | |
| 2013/0195447 | A1* | 8/2013 | Ashwood-Smith | H04Q 11/0005 398/34 |
| 2014/0334818 | A1* | 11/2014 | Mehrvar | H04Q 11/0066 398/51 |
| 2014/0334819 | A1* | 11/2014 | Mehrvar | H04Q 11/0003 398/51 |
| 2014/0334821 | A1* | 11/2014 | Mehrvar | H04Q 11/0005 398/54 |
| 2015/0280854 | A1* | 10/2015 | Matsukawa | H04J 14/022 398/3 |
| 2015/0289035 | A1* | 10/2015 | Mehrvar | H04L 49/356 398/51 |
| 2016/0036520 | A1* | 2/2016 | Swinkels | H04B 10/03 398/1 |
| 2016/0173366 | A1* | 6/2016 | Saad | H04L 45/22 370/218 |
| 2017/0093487 | A1* | 3/2017 | Grammel | H04B 10/038 |
| 2017/0230276 | A1* | 8/2017 | Ceccarelli | H04L 45/04 |
| 2017/0244631 | A1* | 8/2017 | Guichard | H04L 45/50 |
| 2017/0257684 | A1* | 9/2017 | Anand | H04Q 11/0066 |

FOREIGN PATENT DOCUMENTS

| | | |
|---|---|---|
| EP | 1126740 A2 | 8/2001 |
| EP | 1653639 A1 | 5/2006 |
| JP | 2012231337 A | 11/2012 |
| WO | 2008037192 A1 | 4/2008 |
| WO | 2014019221 A1 | 2/2014 |
| WO | 2016012043 A1 | 1/2016 |

OTHER PUBLICATIONS

Daniel Dib: "Segment Routing: Potential for Far-Reaching Network Effects", https://www.networkcomputing.com/networking/segment-routing-potential-far-reaching-network-effects/516090694, (Year: 2015).*

Lazzeri et al: "Efficient Label Encoding in Segment-Routing Enabled Optical Networks", 2015 International Conference on Optical Design and Modeling (ONDM), May 2015, pp. 34-38 (Year: 2015).*

Ben Yoo, S.J., "Optical Packet and Burst Switching Technologies for the Future Photonic Internet", Journal of Lightwave Technology, vol. 24, No. 12, pp. 4468-4492, Dec. 2006.

Blumenthal et al., "Optical Signal Processing for Optical Packet Switching Networks", IEEE Communication Magazine, 7 pages, Feb. 2003.

Seddighian et al., "Low-cost, Scalable Optical Packet Switching Networks with Multi-Wavelength Labels". 3 pages, 2007.

Wada et al., "Multi-hop, 40 Gbit/s variable length photonic packet routing based on multi-wavelength label switching, waveband routing, and label swapping", Wednesday Morning—OFC 2002, pp. 216-217, 2002.

XP32788780A.Francesco Lazzeri:"Efficient label encoding in segment-routing enabled optical networks", 2015 International Conference on Optical Network Design and Modeling (ONDM). May 2015. 5 pages.

XP32872331A. Clarence Filsfils et al. The Segment Routing Architecture. 2015 IEEE. 6 pages.

* cited by examiner

SEGMENT ROUTING FOR OPTICAL NETWORKS

FIELD OF THE DISCLOSURE

This application relates to optical networks, in particular routing of optical signals in such networks.

BACKGROUND

Segment routing, also known as source based routing, has been used in electronic routers in communication networks. Segment routing is at least in part enabled by the at least one node in an optical network knowing the topology of the network including how each node is connected to another. A packet traversing a segment routed network typically includes a header and a payload. The header of a segment routed packet will typically include complete routing information. The routing information typically includes is a list of nodes and/or links that the packet is routed over to traverse the network. When a node in the segment routed network receives a packet, it can determine where to forward the packet by inspecting the routing information stored in the header. Before forwarding the packet, the node will typically remove an address from the source routing list. In another implementation, in place of a list of node addresses, the source routing list includes a list of the ports that each node should forward the packet to. In such an embodiment, when a node receives a packet it routes the packet to the port identified in the header and removes the port from the list. Each node in the network performs the same process.

Currently, segment routing has been implemented at a network layer. To obtain the segment routing information, the packet header must be read in the electrical domain. In segment routed networks making use of optical links, the optical signal must be converted into the electrical domain so that the routing information can be read. Any required modifications to the header are then performed, and the packet is forwarded. The forwarding process often involves a reconversion into the optical domain for transmission on an optical link. This optical-electrical-optical (O-E-O) conversion process is time and resource intensive.

Routing of signals in an optical network is intended to be fast, and accordingly there is limited processing time per node. Continuing to improve the performance of optical networks may help to satisfy increasing demand for both bandwidth and speed in telecommunication networks.

SUMMARY OF THE DISCLOSURE

According to an embodiment of the disclosure there is provided a method for operating an optical switch node in a segment routed optical network. The method involves receiving from a first prior node, over a first optical link in the optical network, a first optical signal carrying a payload and control information associated with the optical switch node and with subsequent optical switch nodes in a segment routed path. A further step involves controlling a switching fabric in accordance with the control information associated with the optical switch node read from the received first optical signal in a manner non-destructive to the control information associated with the subsequent optical switch nodes in the segment routed path. A further step involves forwarding to a subsequent node in the optical network, through the switching fabric, in a manner determined in accordance with the read control information, an optical signal carrying the received payload and the control information associated with the subsequent optical switch nodes in the segment routed path.

According to another embodiment of the disclosure there is provided a method for operating a source node in a segment routed optical network. The method involves generating a segment routed path comprising an ordered list of optical switch nodes. A subsequent step involves generating control information for each of the optical switch nodes in the ordered list. A further step involves encoding the generated control information into at least one control wavelength channel. Another step involves transmitting a payload along with the encoded control information to a first optical switch node in the ordered list.

According to a further embodiment of the disclosure, there is provided an optical switch node for use in a segment routed optical network. The optical switch node includes an input port configured to receive from a prior node in the optical network, over an optical link, an optical signal carrying a payload and control information associated with the optical switch node and with subsequent optical switch nodes in a segment routed path. The optical switch node also includes a wavelength diverter configured to optically divert a portion of the received optical signal. The optical switch node also includes an optical switch fabric optically coupled to the input port configured to route an optical signal including the received payload and control information associated with at least the subsequent optical switch nodes to a subsequent node in the optical network. The optical switch node further includes a controller, optically coupled to the wavelength diverter and the optical switch fabric. The controller is configured to control the optical switch fabric to direct the optical signal including the received payload and control information associated with at least the subsequent optical switch nodes to an output port selected in accordance with information carried in the diverted portion of the received optical signal.

According to yet another embodiment of the disclosure there is provided an optical switch node for use in a segment routed optical network. The optical switch node includes a controller configured to: generate a segment routed path through the optical network comprising an ordered list of optical switch nodes; generate control information for each of the optical switch nodes in the ordered list; encode the generated control information into at least one control wavelength channel; and transmit a payload along with the encoded control information to a first optical switch node in the ordered list.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

Figure 1:
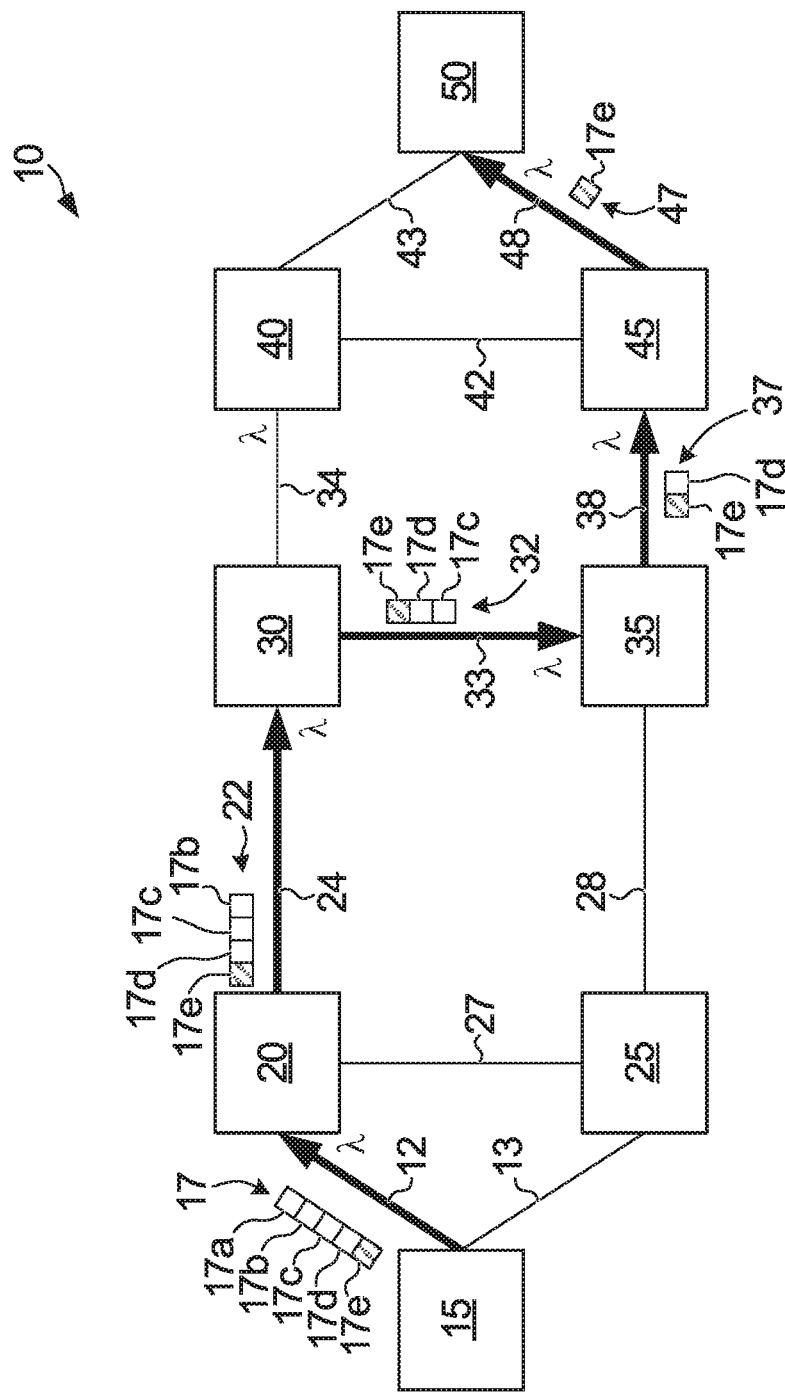
FIG. 1 is a block diagram of an optical network utilizing photonic segment routing according to an aspect of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Aspects of the disclosure relate to enabling segment routing in networks made up of photonic switch nodes. A network of photonic switch nodes is considered to be a collection of nodes capable of switching optical signals, nodes within the collection of nodes connected to each other by optical links. Each optical link between adjacent nodes may be considered a single hop. The optical signal traverses the optical network from a source node to a destination node. The source node and destination node could be adjacent nodes such that the optical signal makes a single hop from source node to destination node, or they could be separated by one or more other nodes such that the optical signal traverses two or more hops.

In some embodiments of the disclosure, the source node, having some predetermined knowledge of the network topology, such as a number of nodes in the network and a connectivity of the nodes in the network, generates a list of nodes and/or optical links between nodes that form a route in the network from the source node to the destination node. The nodes in the network do not necessarily need to know the entire route from source node to destination node. Each node simply decodes the control information identifying the next hop in the route towards the destination node. By utilizing the decoded control information identifying the next hop, a switch in the node can be controlled to route the optical signal including the payload and some or all of the control information onto the next optical link toward the destination node. In another embodiment, a network controller has knowledge of the network topology and provides a source routed list to the source node. The use of a controller to create the segment routing list allows for a centralization of the knowledge of the network topology and allows a plurality of nodes to act as source nodes without needing to provide each of them with the network topology.

In some aspects the optical signal may be considered to be a series of photonic frames, or bursts, in which each frame carries all of the routing information needed to route the frame from source node to destination node. Each frame being transmitted from the source node to the destination node includes control information and payload. A portion of the frame containing the control information may be transmitted on a same wavelength channel for all optical links in the network. Alternatively, the control information may be transmitted on multiple dedicated wavelength channels, wherein each dedicated wavelength channel is for a particular optical link of the network.

The list of nodes of the intended route from source to destination forms at least part of the control information that is transmitted by the source node in an optical signal together with payload. Each node in the path receives both the payload and control information. In accordance with the received control information, a node will identify the next hop and forward the payload accordingly. Each node in the route can read the relevant control information, in a manner non-destructive to the control information associated with other nodes in the segment routed path. The expression "in a manner non-destructive to the control information associated with other nodes" is used to convey that the content of the control information associated with other nodes is not fundamentally altered. The present node is able to extract relevant control information and pass the remaining control information to the subsequent nodes. The phrase "relevant control information" should be understood to refer to control information needed by the receiving node. If a segment route defining the link that the signal should be forwarded on at each hop is encoded in the control information, each node will find the link that it should forward the signal on to be relevant, while the routing information intended for other nodes will not be relevant. While in some embodiments described in detail below the control information associated with subsequent nodes is temporarily isolated from the payload as it traverses the switch node or is converted from the optical domain to the electrical domain and then back to the optical domain by the switch node currently receiving the optical signal, the content of the control information associated with the subsequent nodes is not altered.

In addition to the control information being used to forward routing information to each node in the path, other information may be encoded in the control information. The source node, or a network controller, may include additional control information that is not routing information. For example, a destination node may need to be reset on a per frame basis (reset signal for a burst mode receiver) or on a multiple frame basis. Some nodes may be capable of triggering a frame reset on their own, but other nodes may require an external trigger signal of some form. The source node may include information in the control information that acts as an external trigger.

In some embodiments, source node to intermediate node and/or end-to-end management communication information and update information (upgrade, status, etc) can also be transmitted in the control information between two nodes.

A first aspect of an optical segment routing network may be implemented such that photonic segment routing is performed using a single wavelength channel for transmitting the control information over any of the optical links in the network. The single wavelength channel can be used to carry all the routing information for the N-hops from the source node to destination node. Each node in the route can filter the optical signal it receives to drop the single wavelength channel including the control information and allows the payload to pass. The control information on the single wavelength channel can be decoded and used to control a switch in the node. The payload and at least the control information relevant to subsequent nodes in the route are then forwarded by the switch toward the destination node.

A second aspect of an optical segment routing network may be implemented such that photonic segment routing is performed using multiple wavelengths for transmission of the control information. In one embodiment, M control wavelengths are used for an M-link photonic network (M being the total number of optical links connecting the source and destination nodes in the route). Each of the nodes in the route has an associated control frequency for control information. A node receives the optical signal carrying both control and payload information. This signal is filtered to extract the dedicated wavelength channel, associated with the node. This wavelength channel carries the control information specific to the node. This filtering allows the payload, and control information not associated with the node, to pass. The control information for the node is information that will allow the node to route the optical signal on its next hop to a subsequent node. The control information is decoded and used to control a switch in the node. Using the routing information, the payload and some or all of the control information is forwarded toward the destination node by the switch. It will be understood that in extracting control information from a filtering, that it is not necessary to forward information carried in the filtered wavelength to subsequent nodes. However, it is also not necessary to prevent transmission in the filtered wavelengths.

The first and second aspects described above involve filtering a received optical signal to extract a particular wavelength carrying control information. An alternative to this is to tap the received optical signal and read and decode control information from a tapped portion of the optical signal and use the decoded information to control routing of the received optical signal.

Referring to FIG. 1, a more detailed description of the first embodiment described above pertaining to a single control information wavelength channel for all optical links will now be provided. FIG. 1 illustrates a segment routing optical network 10 having multiple nodes 15, 20, 25, 30, 35, 40, 45 and 50 and respective optical links 12, 13, 24, 27, 28, 33, 34, 38, 42, 43 and 48 connecting the nodes. Nodes 15 and 20 are connected by optical link 12, nodes 15 and 25 are connected by optical link 13, nodes 20 and 25 are connected by optical link 27, and so forth. In the example of FIG. 1, node 15 may be considered a source node and node 50 is considered a destination node. The source node 15 generates a list of links that will be used to route an optical signal including control information and payload to the destination node 50. Also shown in FIG. 1 are representations of control information 17, 22, 32, 37 and 47 being transmitted on a single wavelength channel λ for each optical link being traversed 12, 24, 33, 38, 48 across the network 10 from source node 15 to destination node 50. Each block in the control information (for example 17a, 17b, 17c, 17d and 17e in control information 17) represents the control information that is to be extracted and used by a respective receiving node. The blocks are arranged in such a manner by the source node that the receiving nodes can extract the respective control information allocated for them appropriately. Control information 17 is transmitted on optical link 12 and received by node 20. Node 20 extracts the control information 17a from the control information 17 (which will be discussed in greater detail below with reference to FIG. 2) and node 20 uses that portion of the control information to control a switch in node 20 to route the payload (not shown) and remainder of the control information 22 (including 17b, 17c, 17d and 17e) toward destination node 50 via node 30. Control information 22 is transmitted on optical link 24 and received by node 30. Node 30 extracts the control information 17b from the control information 22 and uses that portion of the control information to control a switch in node 30 to route the payload (not shown) and remainder of the control information 32 (including 17c, 17d and 17e) toward destination node 50 via node 35. Control information 32 is transmitted on optical link 33 and received by node 35. Node 35 extracts the control information 17c from the control information 32 and uses that portion of the control information to control a switch in node 35 to route the payload (not shown) and remainder of the control information 37 (including 17d and 17e) toward destination node 50 via node 45. Control information 37 is transmitted on optical link 38 and received by node 45. Node 45 extracts the control information 17d from the control information 37 and uses that portion of the control information to control a switch in node 45 to route the payload (not shown) and remainder of the control information 47 (including 17e) toward destination node 50. Control information 47 is transmitted on optical link 48 and received by destination node 50. Destination node 50 extracts the control information 17e from the control information 47 and uses that portion of the control information to update destination node as appropriate, for example to trigger a burst mode reset in node 50 once the payload (not shown) is received and processed.

Figure 2:
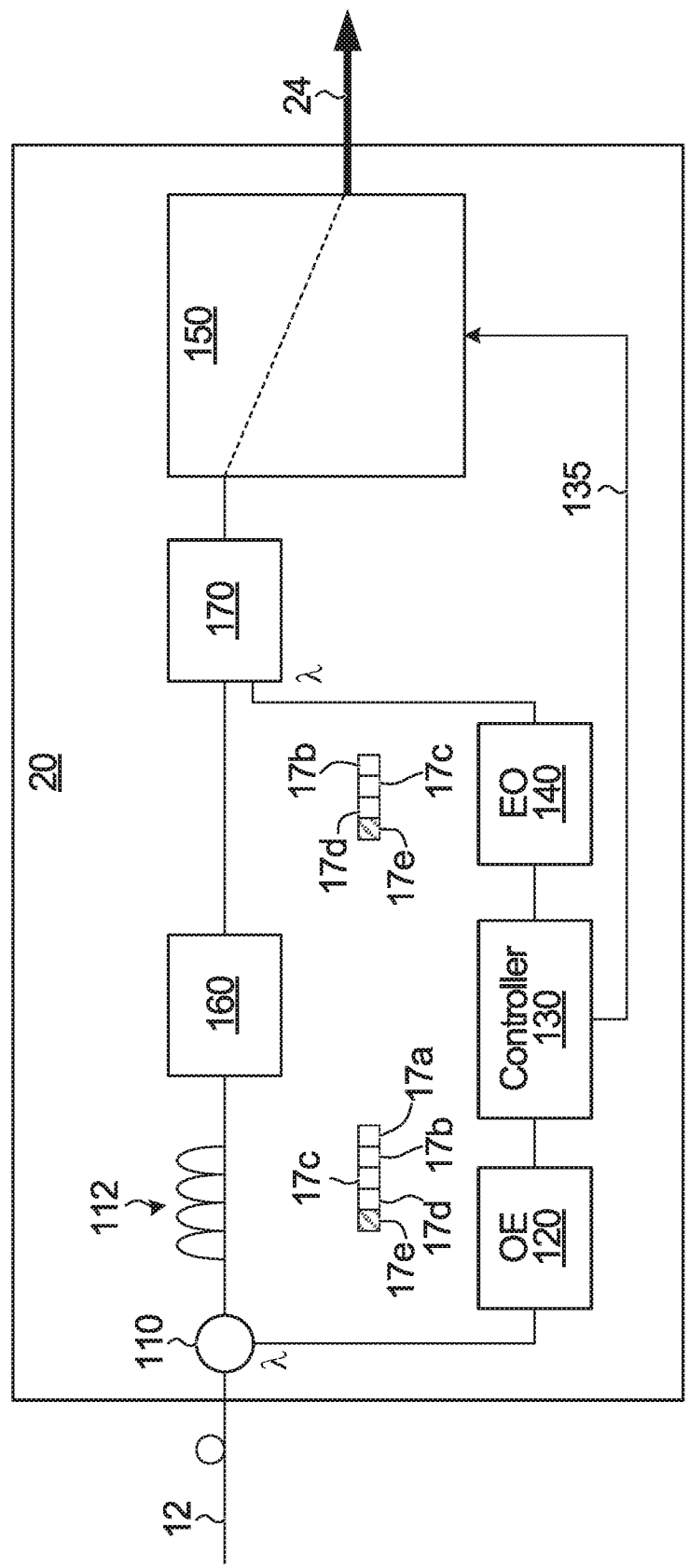
FIG. 2 is a block diagram of a switch node in the optical network of FIG. 1 utilizing photonic segment routing according to an aspect of the disclosure.

A more detailed operation of node 20 from FIG. 1 will now be explained with reference to FIG. 2. FIG. 2 illustrates node 20 receiving an optical signal on optical link 12. The optical signal being received at node 20 includes both control information 17 (17a, 17b, 17c, 17d, 17e) on a single wavelength channel λ and payload 112 on multiple wavelength channels. An optical filter 110 receives the optical signal and drops the wavelength channel λ carrying the control information 17 and passes the payload 112. The dropped wavelength channel λ carrying the control information 17 is converted to an electrical signal by optical to electrical converter 120. The electrical signal is provided to a controller 130. The controller 130 decodes a portion 17a of the control information 17 and uses the decoded portion 17a of the control information to control the optical switch 150 via switching control signal output 135. The controller 130 sends the control information 17b, 17c, 17d and 17e to an electrical to optical converter 140 to convert the electrical domain control information back to the optical domain on wavelength channel λ. This converted optical signal carrying control information is then combined with the payload 112 using combiner 170. In the example of FIG. 2 the payload 112 is delayed before being recombined with the remainder of the control information by delay element 160. The delay element 160 may compensate for delay introduced to the control information by the optical to electrical conversion performed by the optical to electrical converter 120 and the electrical to optical conversion performed by the electrical to optical converter 140. The delay element 160 may also compensate for processing delay in the controller 130 and/or delays resulting from the optical switch 150 such as switch setup delay and switch response time delay. The delay element 160 aids in maintaining a level of synchronization between the payload 112, the remainder of the control information 17*b*, 17*c*, 17*d* and 17*e* and the switching control signal output 135. The payload 112 and the remainder of the control information 17*b*, 17*c*, 17*d* and 17*e* are then routed by the optical switch 150 based on the decoded portion of the control information 17*a* received from the controller 130 via switching control signal output 135. The payload 112 and the remainder of the control information are routed on optical link 24 on toward destination node 50. It will be understood that in this embodiment, an O-E-O conversion is only required for the control information, which reduces the O-E-O conversion complexity.

While FIG. 2 shows only optical links 12 and 24 coupled to node 20, it is understood that these are two optical links of many that may be coupled to the node and the node would operate similarly as described above to route signals between any two of the multiple links coupled to the node. Each of the optical links may be optically coupled to an input port of the node and the inputs ports are each coupled to a respective filter and those filters coupled to the controller 130.

The other nodes 25, 30, 35, 40 and 45 of FIG. 1 operate in a similar manner as described above for node 20 to receive the optical signal and forward it on towards the destination node.

Destination node 50 operates in a similar manner to node 20 as described above in terms of filtering and dropping control information, but instead of using that control information to control a switch, the control information may include alternative information for use by the destination node, for example to trigger a burst mode reset or communicate upgrade, source node to intermediate node or end-to-end management information to the destination node.

Optical-to-Electrical (OE) and Electrical-to-Optical (EO) conversion components 120, 140 are shown separately from the controller in FIG. 2, but one or both components could be implemented together with the controller 130. In some embodiments the OE component is a photodiode and the EO component is light source, such as a laser diode, that can be modulated in accordance with the electrical domain control information.

Delay element 160 may be implemented using fiber delay lines (FDL). In some embodiments the delay element 160 may be implemented using a silicon photonic chip that is integrated with filter 110 and combiner 170 in combination with a switch fabric 150 that is also implemented as a silicon photonic chip The controller 130 may be implemented in hardware or software, or some combination to the two.

The filter 110 may be a wavelength tunable filter, such as ring resonators, to accommodate the wavelength channel used as the control information wavelength channel to be varied over different wavelength channels according to system requirements. The filter may also be tunable over a wide spectrum of wavelength channels such that the control information wavelength could be anywhere in, for example, the 1550 nm waveband or the 1310 nm waveband. This would allow a node to be versatile enough to accommodate the control information in the 1550 nm waveband and payload in the 1310 nm waveband and vice versa, according to system requirements. The optical switch 150 could be implemented according to any known manner of implementing an optical switch that would allow operation as described herein.

Figure 3:
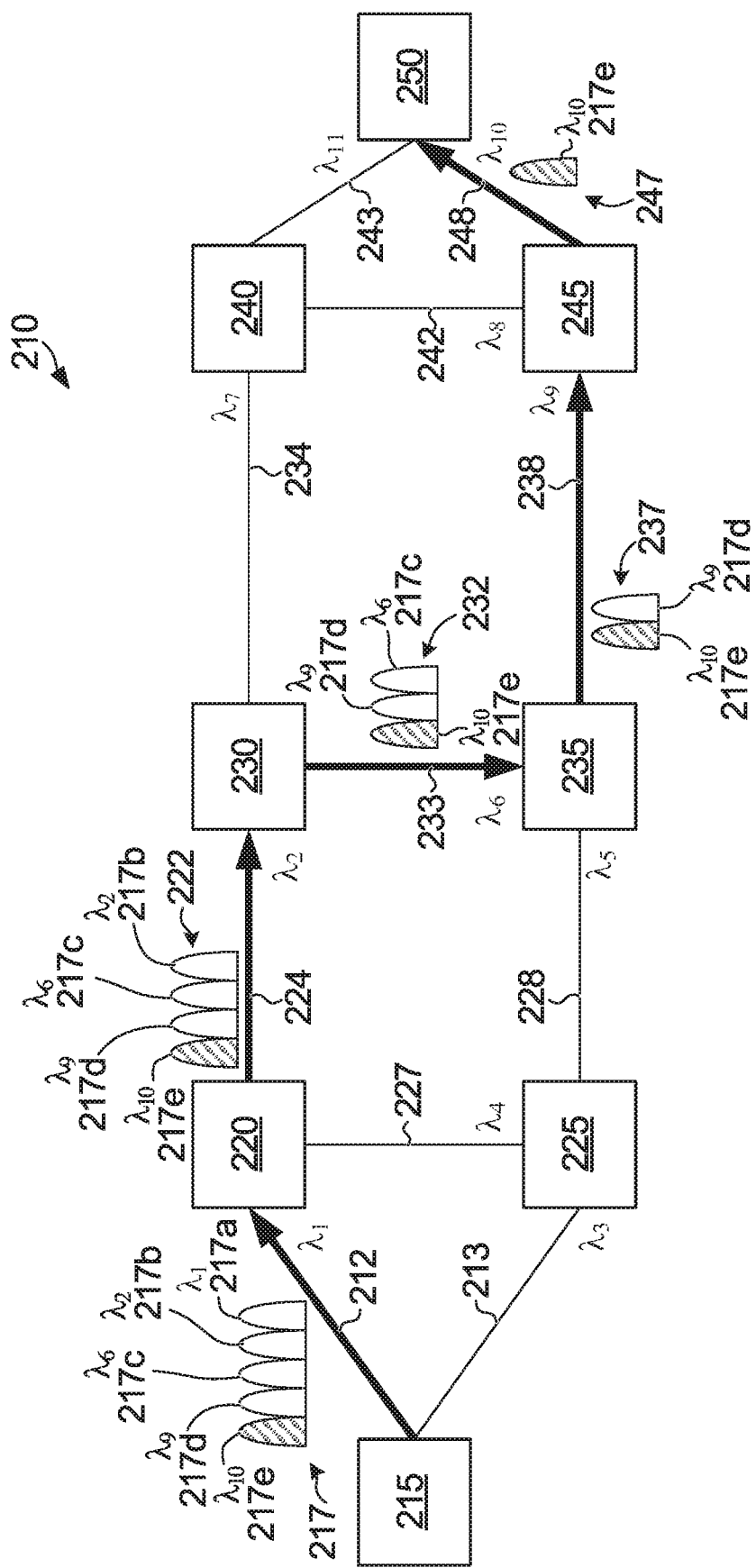
FIG. 3 is a block diagram of an optical network utilizing photonic segment routing according to an aspect of the disclosure.

A more detailed description of the second embodiment described above pertaining to a multiple control wavelength channels will now be described with reference to FIG. 3. FIG. 3 illustrates a network 210 having multiple nodes 215, 220, 225, 230, 235, 240, 245 and 250 and multiple optical links 212, 213, 224, 227, 228, 233, 234, 238, 242, 243 and 248 connecting the nodes. Nodes 215 and 220 are connected by optical link 212, nodes 215 and 225 are connected by optical link 213, nodes 220 and 225 are connected by optical link 227, and so forth. In the example of FIG. 3, node 215 may be considered a source node and node 250 is considered a destination node. The source node 215 generates a list of links that will be used to route an optical signal including payload and control information to the destination node 250. In the example of FIG. 3, the control information for each optical link in the list is encoded on a separate wavelength instead of the control information for all of the optical links in the list being encoded on a single wavelength as in FIG. 1. Each optical link in the network is shown in FIG. 3 with an associated $\lambda_n$, which is representative of the wavelength channel used for control information for that channel. Also shown in FIG. 3 are representations of control information 217, 222, 232, 237 and 247 being transmitted on respective wavelength channels $\lambda_1, \lambda_2, \lambda_6, \lambda_9, \lambda_{10}$ for each optical link being traversed across the network from source node 215 to destination node 250. As an example, control information 217 (217*a*, 217*b*, 217*c*, 217*d* and 217*e*) is encoded on multiple wavelength channels $\lambda_1, \lambda_2, \lambda_6, \lambda_9, \lambda_{10}$ each carrying control information for a respective optical link.

Control information 217 is transmitted on the multiple wavelength channels on optical link 212 and received by node 220. Node 220 extracts the control information 217*a* on wavelength $\lambda_1$ from the control information 217 (which will be discussed in greater detail below with reference to FIG. 4) and uses the extracted control information to control a switch in node 220 to route the payload (not shown) and the control information 222 relevant to subsequent nodes (including 217*b*, 217*c*, 217*d* and 217*e*) on wavelength channels $\lambda_2, \lambda_6, \lambda_9, \lambda_{10}$ toward destination node 250 via node 230. The wavelength channels carrying control information 222 are transmitted on optical link 224 and received by node 230. Node 230 extracts the control information 217*b* from the control information 222 and uses the extracted control information to control a switch in node 230 to route the payload (not shown) and the control information relevant to subsequent nodes 232 (including 217*c*, 217*d* and 217*e*) on wavelength channels $\lambda_6, \lambda_9, \lambda_{10}$ toward destination node 250 via node 235. The wavelength channels carrying control information 232 are transmitted on optical link 233 and received by node 235. Node 235 extracts the control information 217*c* from the control information 232 and uses the extracted control information to control a switch in node 235 to route the payload (not shown) and the control information 237 relevant to subsequent nodes (including 217*d* and 217*e*) on wavelength channels $\lambda_9, \lambda_{10}$ toward destination node 250 via node 245. The wavelength channels carrying control information 237 are transmitted on optical link 238 and received by node 245. Node 245 extracts the control information 217*d* from the control information 237 and uses the extracted control information to control a switch in node 245 to route the payload (not shown) and the control information 247 relevant to the subsequent node (including 217*e*) on wavelength channel $\lambda_{10}$ toward destination node 250. The wavelength channels carrying control information 247 is transmitted on optical link 248 and received by destination node 250. Destination node 250 extracts the control information 217*e* from the control information 247 and uses the extracted control information to set up the node for an incoming signal and/or configure node parameters. An example of this may be that the control information 217e triggers burst mode reset in node 250 once the payload (not shown) is received and processed.

Figure 4:
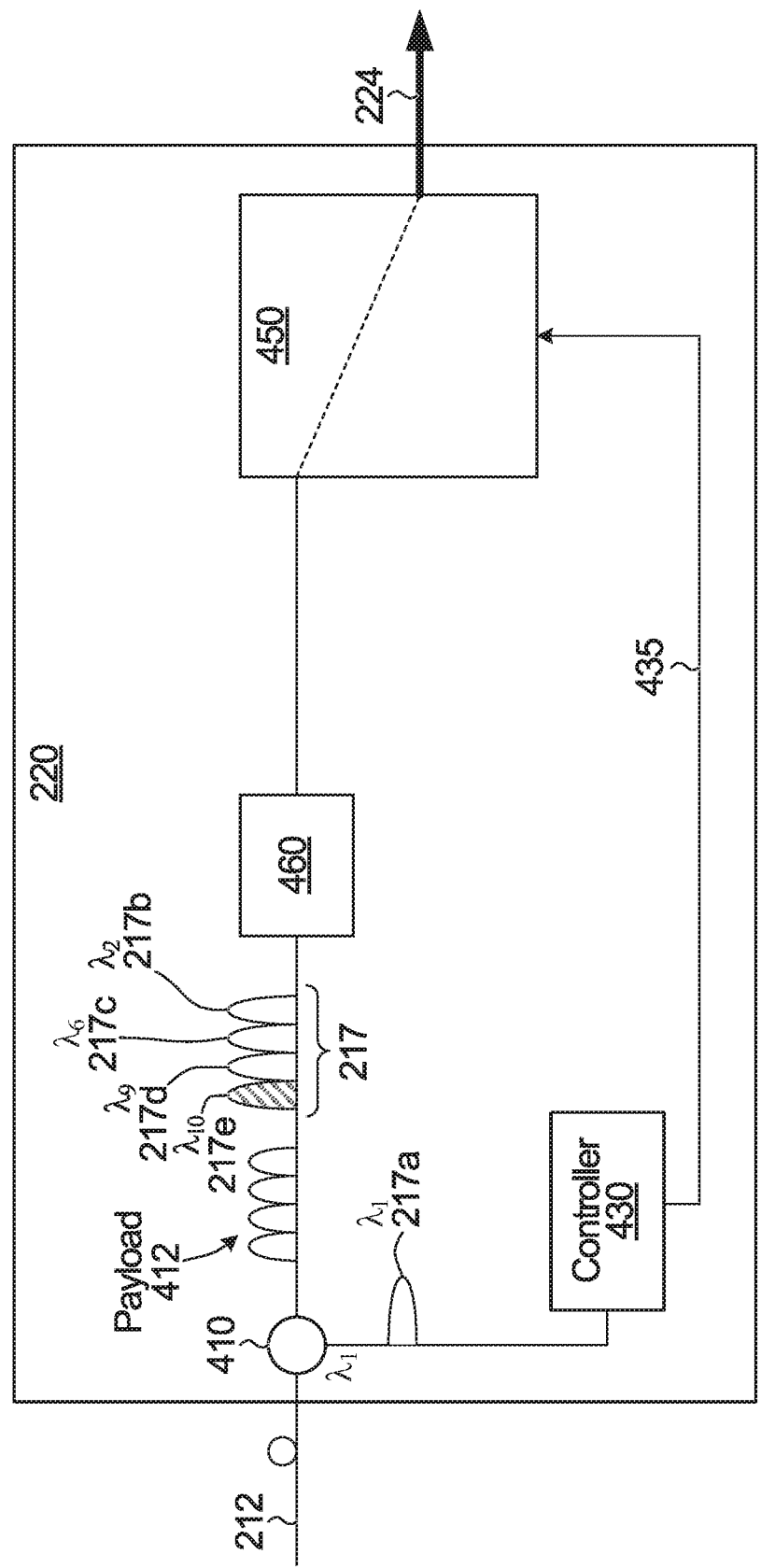
FIG. 4 is a block diagram of a switch node in the optical network of FIG. 3 utilizing photonic segment routing according to an aspect of the disclosure.

A more detailed operation of node 220 from FIG. 3 will now be explained with reference to FIG. 4. FIG. 4 illustrates node 220 receiving an optical signal on optical link 212. The optical signal being received at node 220 includes both control information 217 (217a, 217b, 217c, 217d and 217e) on wavelength channels $\lambda_1, \lambda_2, \lambda_6, \lambda_9, \lambda_{10}$ and payload 412. An optical filter 410 receives the optical signal and extracts the wavelength channel $\lambda_1$ carrying the control information 217a dedicated to that optical link and passes the payload 412 and wavelength channels $\lambda_2, \lambda_6, \lambda_9, \lambda_{10}$ carrying the control information 217b, 217c, 217d and 217e relevant to subsequent nodes. The control information 217a carried on wavelength channel $\lambda_1$, once extracted, is provided to a controller 430. The controller 430 controls an optical switch 450 via switching control signal output 435 in accordance with the control information 217a. In the example of FIG. 4 the payload 412 and wavelength channels $\lambda_2, \lambda_6, \lambda_9, \lambda_{10}$ carrying the control information 217b, 217c, 217d and 217e relevant to subsequent nodes are delayed by delay element 460 before being switched in order to compensate for any delay introduced by the controller 430. The delay element 460 aids in maintaining a level of synchronization between the effect of switching control signal 435 on switch 450 and the arrival of the payload 412 and the control information 217b, 217c, 217d and 217e relevant to downstream nodes. The payload 412 and control information 217b, 217c, 217d and 217e on wavelength channels $\lambda_2, \lambda_6, \lambda_9, \lambda_{10}$ are then routed appropriately by the optical switch 450 in accordance with switching control signal output 435. The payload 412 and the control information 217b, 217c, 217d and 217e are routed on optical link 224 on toward destination node 250.

While FIG. 4 shows only optical links 212 and 224 coupled to node 220, it is understood that these are two optical links of many that may be coupled to the node and the node would operate similarly as described above to route signals between any two of the multiple links coupled to the node. The other nodes 225, 230, 235, 240 and 245 of FIG. 3 may operate in a similar manner as described above for node 220.

Destination node 250 can operate in a similar manner to node 220 as described above in terms of filtering and dropping control information, but instead of using that control information to control a switch, the control information may include alternative information for use by the destination node, for example to trigger a burst mode reset or communicate upgrade, source node to intermediate node or end-to-end management information to the destination node.

Delay element 460 may be implemented using fiber delay lines (FDL). In some embodiments the delay element 460 may be implemented using a silicon photonic chip that is integrated with filter 410 in combination with a switch fabric 450 that is also implemented as a silicon photonic chip.

The controller 430 may be implemented in hardware or software, or some combination to the two.

The filter 410 may be a wavelength tunable filter such as ring resonator to accommodate the wavelength channel used as the control information wavelength channel to be varied over different wavelength channels according to system requirements. The filter may also be tunable over a wide spectrum of wavelength channels such that the control information wavelength could be anywhere in, for example, the 1550 nm waveband or the 1310 nm waveband. In a node that has multiple filters, i.e. a filter for each optical link it is connected to in the network, the node may have a mix of filters that are all fixed wavelength filters, all tunable wavelength filters and a mix of the two types of wavelength filters.

FIGS. 1 and 3 illustrate particular examples of each network having eight nodes in the network, each node connected to two or three adjacent nodes. More generally, it is understood that in practical implementations, the number of nodes and the connectivity of nodes could be different than that that shown in FIGS. 1 and 3. It is also to be understood that the network could be made up of a collection of nodes that have any of the types of operation described herein, i.e. filtering to read and decode control information and/or tapping an input signal to read and decode control information.

Figure 5:
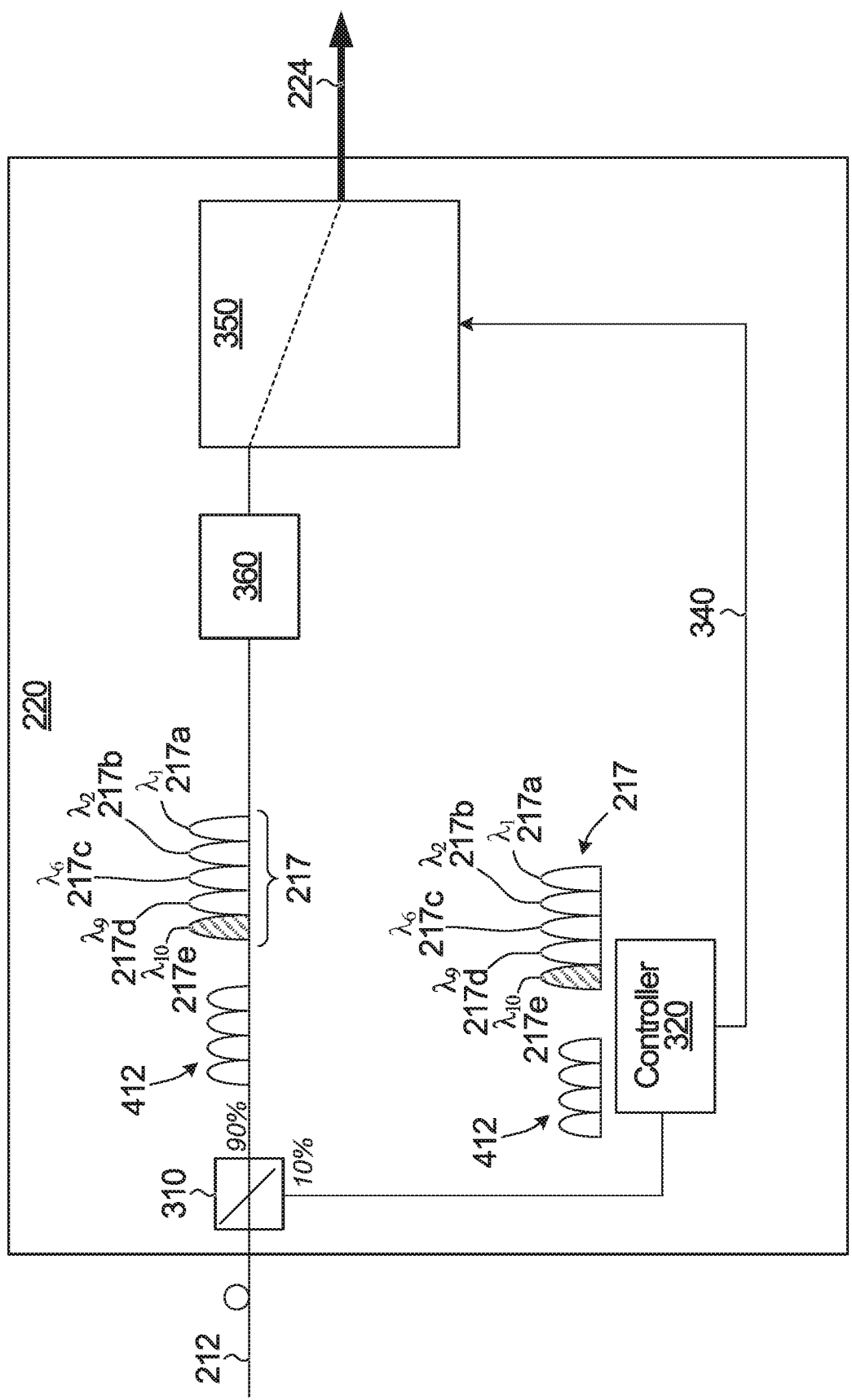
FIG. 5 is a block diagram of another switch node in the optical network of FIG. 3 utilizing photonic segment routing according to an aspect of the disclosure.

A more detailed operation of node 220 from FIG. 3 will now be explained in terms of an alternative implementation with reference to FIG. 5. FIG. 5 illustrates an optical signal being received at node 220 on optical link 212. The optical signal being received at node 220 includes both control information 217 (217a, 217b, 217c, 217d and 217e) on wavelength channels $\lambda_1, \lambda_2, \lambda_6, \lambda_9, \lambda_{10}$ and payload 412. An optical splitter 310 receives the optical signal and taps 10% of the optical signal and passes 90% of the optical signal (it will be understood that the particular percentages described with respect to FIG. 5 are intended for the purposes of an example and should not be viewed as limiting). Using a splitter results in each path propagating versions of the received signal (both payload and all control information), albeit at different representative powers. The tapped portion of the optical signal is provided to a controller 320. The controller 320 decodes the control information pertinent to the present node (i.e. the control information 217a on wavelength channel $\lambda_1$) and controls an optical switch 350 via switching control signal output 340 in accordance with the relevant control information. The 90% portion of the optical signal including the payload 412 and control information 217 (217a, 217b, 217c, 217d and 217e) on wavelength channels $\lambda_1, \lambda_2, \lambda_6, \lambda_9, \lambda_{10}$, is delayed by delay element 360 before being switched in order to compensate for delay introduced by the controller 320 reading and decoding the control information 217a. The delay induced by delay element 360 may also compensate for processing delay in the controller 320 and delays resulting from the optical switch 350 such as switch setup delay and switch response time delay. The delay element 360 aids in maintaining a level of synchronization between the payload 412, the control information 217 and the switching control signal output 340 from controller 320. The payload 412 and the control information 217 are then routed by the optical switch 350 based on the decoded control information 217a received from the controller 320 via switching control signal output 340. The payload 412 and the control information 217 on wavelength channels $\lambda_1, \lambda_2, \lambda_6, \lambda_9, \lambda_{10}$, are routed on optical link 224 on toward destination node 250. As discussed above with regard to FIG. 3, the controller 320 is provisioned to extract control information on an assigned wavelength from the signal received on optical link 212. The controller 320 is likewise provisioned to extract control information on different wavelengths allocated for different optical links coupled to the node 220.

A similar approach of using an optical splitter to tap the received optical signal could be applied to the implementation of the first embodiment described above pertaining to a single control information wavelength channel containing control information for all of the hops in the network. Instead of the filter 110 in FIG. 2 being used to drop the control information wavelength, an optical splitter could be used to tap off 10% of the received optical signal and have a controller read the control information pertinent to that switching node from the tapped signal. As the payload and control information are maintained together, albeit at a lower power than the received power, the control information does not need to be added back together with the payload as in FIG. 2. A delay element may still be beneficial in the path that the 90% portion of the received optical signal travels through the node as there may be a small temporal offset between the 90% portion of the received signal and the control signal to the optical switch due to the controller having to read and decode the appropriate information from the control wavelength channel as well as switch related delays.

When using an optical splitter to tap a portion of the received optical signal, in some implementations some form of signal amplification may be beneficial on either or both of the signal paths, i.e. the tapped and/or pass through paths to boost the respective signals. Furthermore, while the values of 10% and 90% are described above with regard to the splitting ratio of the splitter, it is understood that such values are only intended as examples and the portion of a received signal that could be tapped in order to read and decode control information for a node that receives the optical signal is implementation specific.

Figure 6:
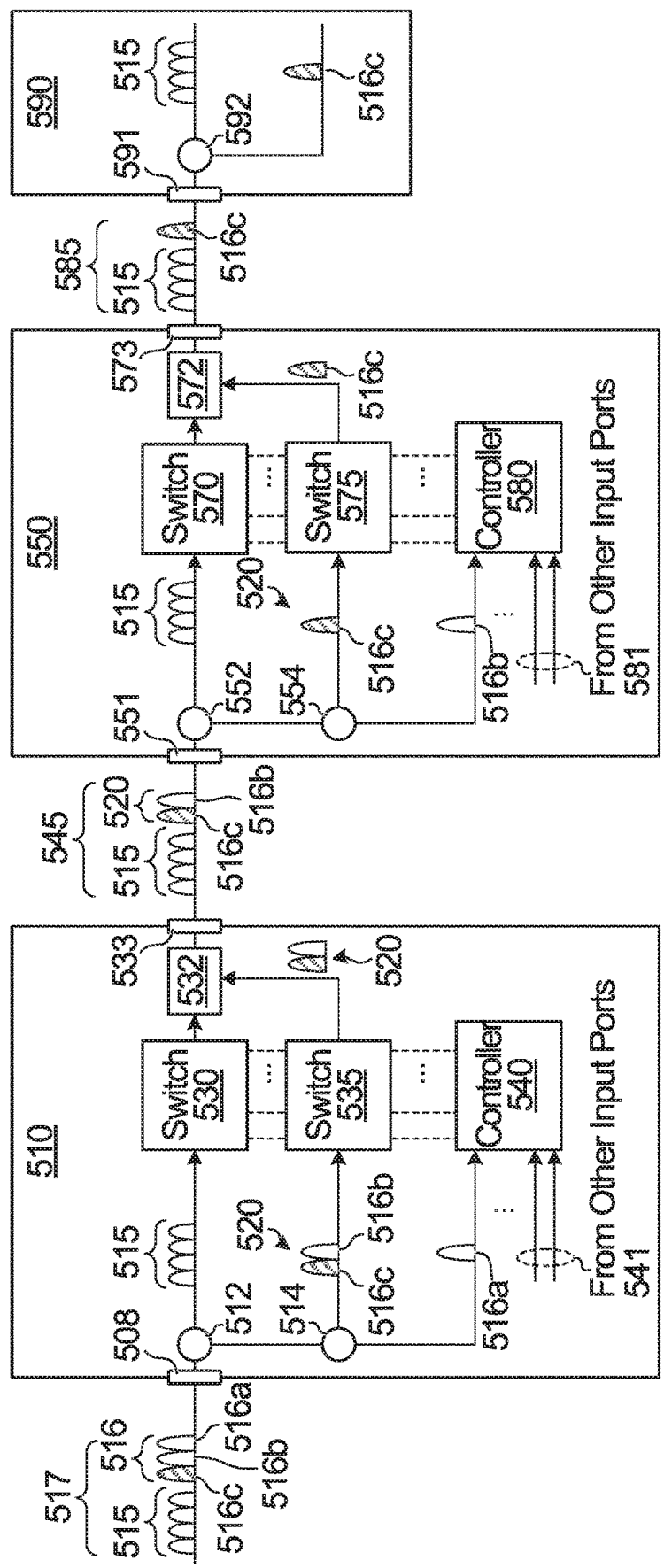
FIG. 6 is a block diagram of two intermediate nodes in an optical network utilizing photonic segment routing according to an aspect of the disclosure.
Figure 7:
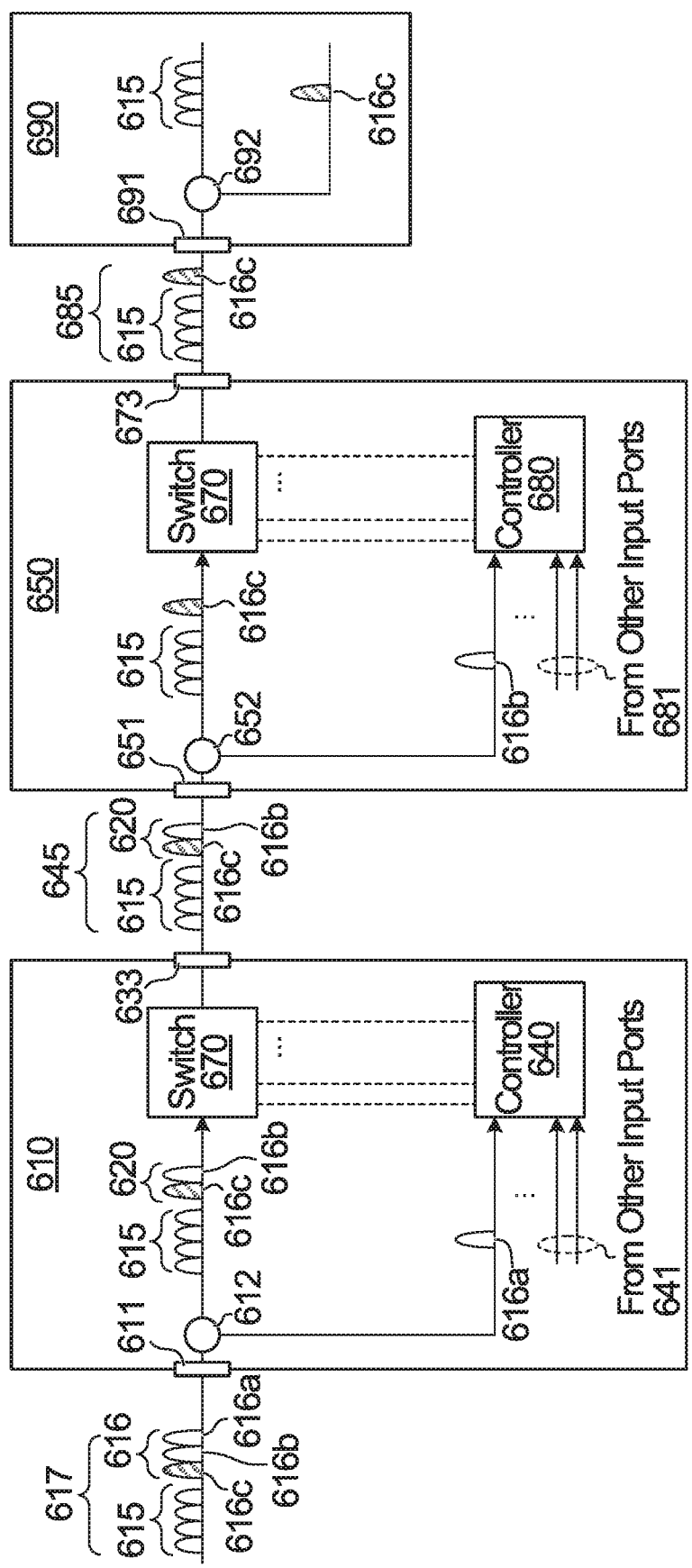
FIG. 7 is a block diagram of two intermediate nodes in an optical network utilizing photonic segment routing according to an aspect of the disclosure.

The following examples described in respect of FIGS. 6 and 7 are implementation specific examples, in which the control information for each optical link is encoded on a dedicated wavelength channel.

FIG. 6 is a schematic diagram of two intermediate nodes 510,550 and a destination node 590 in a portion of an optical network using segment routing in which the intermediate nodes each have two separate optical switches 530,535. Such an implementation may be advantageous for example if a single switch is not capable of providing switching over a spectrum of wavelength encompassing both the payload and control information. In this example, the control information is included in one or more wavelength channels of a first waveband of a received signal and the payload is included in one or more wavelength channels of a second waveband. Optical switch 530 in node 510 is used for switching the first waveband of the received signal and optical switch 535 is used for switching a second waveband of the received signal. Once the payload and control information are switched, the respective signals are combined and forwarded to a subsequent node.

In FIG. 6, the first node 510 is shown receiving an optical signal 517 in the two separate wavebands at receiving port 508. The payload 515 is in the first waveband and the control information 516 (516a, 516b and 516c) is in the second waveband. A first optical filter 512, optically coupled to the input port 508, receives the optical signal 517, drops the second waveband portion carrying the control information 516 and passes the first waveband portion carrying the payload 515. A second optical filter 514, optically coupled to the first optical filter 512, receives the dropped second waveband portion of the received optical signal and drops a further portion of the second waveband portion of the received optical signal, i.e. control information 516a. Control information 516a is on a wavelength channel dedicated to the optical link on which the optical signal 517 was received. The second optical filter 514 passes a portion 520 of the second waveband portion of the received optical signal including control information 516b and 516c. The control information 516a is provided to a controller 540, which is optically coupled to the second optical filter 514, where the control information 516a is decoded and used to configure both of optical switches 530 and 535 (shown as dotted lines from controller 540 to switches 530 and 535).

Optical switch 530 is optically coupled to the first optical filter 512 and receives the first waveband portion carrying the payload 515 passed by optical filter 512, and routes the payload 515 based on decoded control information from controller 540. Optical switch 535 is optically coupled to optical filter 514 and receives the portion 520 passed by optical filter 514 and routes portion 520 based on decoded control information from controller 540. Outputs of the respective optical switches 530 and 535 are then combined by combiner 532 and the resultant optical signal 545 is transmitted from a first output port of node 510 on to node 550.

Node 550 of FIG. 6 performs similar receiving (at input port 551), filtering and switching processes to that of node 510. Optical filters 552 and 554 filter optical signal 545 to separate the payload 515, control information 516c not relevant to node 550 and control information 516b that is relevant to node 550. Control information 516b that is relevant to node 550 is used by controller 580 to configure optical switches 570 and 575. Outputs of the respective optical switches 570 and 575 are then combined by combiner 572 and the resultant optical signal 585 is transmitted from an output port 573 of node 550 on to node 590.

Destination node 590 of FIG. 6 performs similar receiving (at input port 591) and filtering processes to that of nodes 510 and 550. While node 590 would have similar internal physical structure to implement similar functionality to nodes 510 and 550, i.e. two step filtering, a first step of separating wavebands and a second step of filtering the control information for the node from that of the control information for subsequent nodes, for simplicity only a single filter is shown in node 590 to isolate the lone wavelength containing control information from the payload. Optical filter 592 filters optical signal 585 to separate the payload 515 and control information 516c that is relevant to node 590. Control information 516c that is relevant to node 590 is used by a node controller (not shown) in manners described above, for example to trigger a burst reset or for managing end-to-end communications between the source node and destination node or for managing communications between the source node and intermediate node.

Controllers 540 and 580 in nodes 510 and 550 are shown in FIG. 6 to have multiple inputs from other input ports 541,581, upon which the nodes receive optical signals on other optical links. Therefore, while the example implementation of FIG. 6 is described with respect to optical signal 517 being received at input port 508 of node 510 and describes how the optical signal received at that input port is routed, it would be understood that node 510 (and similarly node 550) is configured to operate similarly for optical signals that would be received on any other of the input ports.

FIG. 7 is a schematic drawing of two intermediate nodes 610,650 and a destination node 690 in a portion of a segment routing optical network in which the intermediate nodes each have a single optical switch. The optical switch in each node is capable of switching a wide spectrum of wavelength that may include multiple wavebands. In this example the control information is included in a first waveband and the payload is included in a second waveband and the switch is capable of switching both wavebands together. As a result of being able to switch both wavebands together, the two step filtering process described above with respect to FIG. 6, i.e. a first step of separating the wavebands and a second step of filtering a dedicated wavelength from one of the wavebands to obtain the control information relevant to the node, does not need to be performed.

In FIG. 7, the first node 610 receives an optical signal 617 on an input port 611 in the two separate wavebands, the payload 615 in the first waveband and the control information 616 (616a, 616b and 616c) in the second waveband. An optical filter 612 is optically coupled to input port 611 and receives the optical signal 617. Optical filter 612 drops a first portion of the optical signal 617 and passes a second portion of the optical signal. The dropped first portion of the optical signal carries control information 616a on a wavelength channel dedicated to the optical link on which the optical signal 617 was received. The second portion of the optical signal passed by the optical filter 612 carries the payload 615 and a remainder of the control information 616b and 616c. A controller 640 is optically coupled to the optical filter 612 and the controller 640 receives the control information 616a where it is decoded and used to control optical switch 630. Optical switch 630 receives the passed second portion of the optical signal and routes the payload 615 and control information 616b and 616c as resultant optical signal 645 based on the decoded control information from controller 640. The resultant optical signal 645 is transmitted from output port 633 of node 610 on to node 650.

Node 650 performs similar receiving (at input port 651), filtering and switching processes to that of node 610. Optical filter 652 filters optical signal 645 to separate the payload 615 and control information 616c not relevant to node 650 from the control information 616b that is relevant to node 650. Control information 616c that is relevant to node 650 is used by controller 680 to configure optical switch 670. The resultant optical signal 685 is transmitted from output port 673 of node 650 on to node 690.

Destination node 690 performs receiving (at input port 691) and filtering processes that are similar to nodes 610 and 650. Optical filter 692 filters optical signal 685 to separate the payload 615 and control information 616c that is relevant to node 690. Control information 616c that is relevant to node 690 is used by node 690 as appropriate.

Controllers 640 and 680 in node 610 and 650 are shown in FIG. 7 to have multiple inputs from other input ports 641,681, upon which the nodes receive optical signals on other optical links. Therefore, while the example implementation of FIG. 7 is described with respect to optical signal 617 being received at input port 611 at node 610 and describes how the optical signal received at that input port is routed, it would be understood that node 610 (and similarly node 650) is configured to operate similarly for optical signals that would be received on any other of the input ports.

While the implementations described with respect to FIGS. 6 and 7 used filtering to isolate control information for the respective node receiving the optical signal, it should be understood that an optical tap configuration as described above could be used as an alternative to filtering. For the sake of simplicity, when considering FIG. 7 for instance, the single filter 612 in Node 610 could be replaced by an optical splitter that taps the received optical signal. The control information for the node could be read and decoded from a tapped portion of the optical signal and a remaining pass through portion of the received optical signal could be switched by switch 630 based on the decoded control information.

Figure 8:
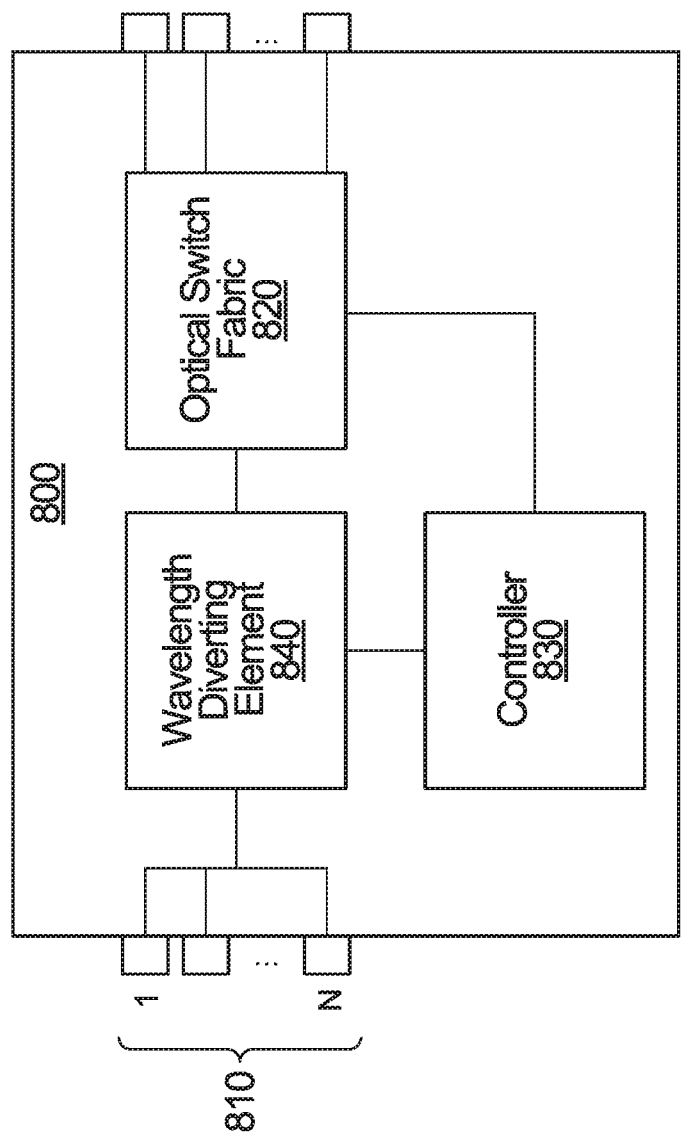
FIG. 8 is a block diagram of an example intermediate or destination switch node according to an aspect of the disclosure.

Referring to FIG. 8, a more general example of an optical switch node 800 for use in an optical network utilizing segment routing will now be described. As detailed above, the segment routed network includes at least a source node that generates and encodes the control information together with the payload, one or more intermediate nodes that route the payload and control information through the network and a destination node that receives the payload and potentially some of the control information. The optical switch node being described in FIG. 8 may be considered an intermediate or destination node in the segment routed optical network, i.e. a node that reads control information on a dedicated wavelength channel. While any given node in the network may have the physical hardware and/or software to perform the functionality of a source node, intermediate node or destination node, the description of FIG. 8 focuses on operation and functionality of the intermediate or destination node.

The optical switch node 800 includes at least one input port. FIG. 8 in particular illustrates a plurality of input ports 810. Each input port is configured to receive from a prior node in the optical network, over an optical link, an optical signal carrying a payload and control information for all subsequent nodes in a segment routed path.

The optical switch node 800 includes a wavelength diverting element 840 optically coupled to the plurality of input ports 810. In some embodiments the wavelength diverting element 840 is an optical filter that acts to divert one or more wavelength channels carrying control information associated with the optical switch node by dropping a wavelength channel carrying the control information associated with the optical switch node and passing a payload. In some embodiments the optical filter may pass control information associated with other optical switch nodes in the segment routed path together with the payload. In some embodiments the wavelength diverting element 840 is an optical splitter that acts to direct one or more wavelengths by taping the received optical signal from one or more of the plurality of input ports 810. In such a scenario not only is the desired wavelength channel carrying the control information associated with the optical switch node diverted by the optical splitter, but the payload and other wavelength channels carrying control information associated with subsequent switch nodes in the designated route as well.

The optical switch node 800 includes an optical switch fabric 820 that is configured to route an optical signal including the received payload and control information associated with at least the subsequent optical switch nodes to a subsequent optical switch node in the optical network. As described above, in some embodiments of the disclosure, control information associated with the node receiving the optical signal may be substantially removed from the received optical signal as part of the process of the node reading the control information associated with the node. As such, the optical signal that is routed by the optical switch fabric in the node is a modified version of the original received signal that may not include control information associated with the node. The optical switch fabric 820 is optically coupled to the wavelength diverting element 840. In other embodiments, for example if the received signal is tapped as opposed to filtered, a representation of the entire received signal may be routed by the switch.

The optical switch node 800 includes a controller 830 optically coupled to the wavelength diverting element 840. The controller 830 is configured to read control information associated with the optical switch node 800 from an optical signal diverted from the wavelength diverting element 840 in a manner that is non-destructive to the control information associated with other nodes in the segment routed path. The controller 830 then controls the optical switch fabric 820 to direct, to an output port selected in accordance with information carried in the diverted portion of the received signal, the optical signal carrying the payload and the control information associated with subsequent nodes in a segment routed path.

In some embodiments, the controller is configured to convert the read control information associated with the optical switch node from the extracted wavelength channel into an electrical signal for controlling the optical switch fabric in the optical switch node. In some embodiments, the controller is configured to convert at least a portion of the electrical signal back into an optical signal on a same wavelength channel as the extracted wavelength channel.

In some embodiments, the wavelength diverting element 840 is an optical filter that is configured to filter the received optical signal to extract all wavelength channels carrying control information. The controller can then read the control information from the extracted wavelength channel. This may involve using a second optical filter to extract the control information associated with the node from the totality of control information.

The control information may include routing information including a list of optical links in the segment routed path comprising a plurality of optical switch nodes. The list defines at least a route from a current optical switch node to a destination optical switch node. The control information may also include burst mode reset information, source node to intermediate node management and update and/or end-to-end (source node to destination node) management and update information. Management and update information may include, for example, commissioning and software update information.

In some embodiments the control information is transmitted in a same waveband as the payload and in other embodiments the control information is transmitted in a different waveband than the payload. A waveband has multiple wavelength channels. For instance, the control information may be in one of a 1310 nm waveband or a 1550 nm waveband, each having a plurality of wavelength channels and the payload in the other of the 1310 nm waveband or the 1550 nm waveband.

Figure 9:
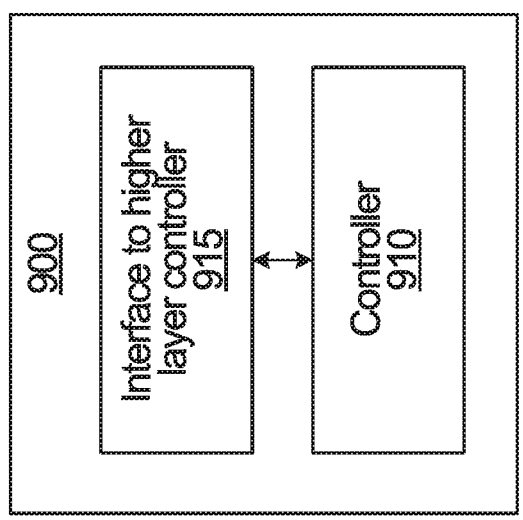
FIG. 9 is block diagram of an example source switch node according to an aspect of the disclosure.

Referring to FIG. 9, an example of a source optical switch node 900 for use in an optical network utilizing segment routing will now be described. The source optical switch node 900 would be considered to have additional hardware and/or software configured to perform normal operations of such a node, which will not be discussed here in detail. Examples of such operations may include converting a payload from an electrical signal into an optical signal upon entering the optical network, converting control information, upon generation according to aspects of the disclosure, into an optical signal for transmission on the optical network and combining of the payload and control information.

The optical switch node 900 includes a controller 910 configured to perform multiple functions. The controller 910 can generate a segment routed path including an ordered list of optical switch nodes. After the segment routed path is generated, the controller 910 can use that information to generate control information that will be associated with each of the optical switch nodes in the ordered list. After the control information is generated, the controller 910 can encode the generated control information into at least one control wavelength channel. The controller 910 can then control transmission of a payload along with the encoded control information to a first optical switch node in the ordered list. The optical switch node 900 also includes an interface 915 to a higher layer controller. An example of a higher layer controller may be a transport SDN controller. The higher layer controller may provide the controller 910 with relevant information for the controller 910 to generate the routing information and/or management and update information for the source node to send to the intermediate or destination nodes.

In some embodiments the controller 910 is configured to encode the generated control information on a plurality of control wavelength channels, wherein each control wavelength channel is encoded with control information for a particular optical link in the optical network.

In some embodiments the controller 910 is configured to further append a burst mode reset to the control information. The burst mode reset can be encoded on a same wavelength channel as all other control information and associated with the destination node or a same wavelength channel as control information for a last optical link before reaching the destination optical switch node.

In some embodiments the controller 910 is configured to further append at least one of end-to-end and/or source node to destination node update and management information to the control information. The at least one of update and management information is encoded on a same wavelength channel as all other control information and associated with the destination node or a same wavelength channel as control information for a last optical link before reaching the destination optical switch node. In some embodiments, the controller 910 is further configured to select the one or more wavelength channels for encoding routing information, end-to-end and/or source node to intermediate node management information and burst mode reset.

In some embodiments, the source optical switch node further includes the features described above that are found in the intermediate nodes. For example, the optical switch node includes at least one input ports, in which each port is configured to receive from a prior node over a respective optical link in the optical network, an optical signal carrying a payload and control information for all subsequent nodes in a segment routed path. The optical switch node includes a wavelength diverting element optically coupled to the plurality of input ports. The optical switch node may also include an optical switch fabric optically coupled to the plurality of input ports for routing an optical signal including the received payload and control information associated with at least the subsequent optical switch nodes, to one of a plurality of transmitting ports. The controller of the node may also be further configured to read control information in the received optical signal associated with the optical switch node, in a manner non-destructive to the control information associated with other nodes in the segment routed path. The controller of the node may also be further configured to control an optical switch fabric to direct, to an output port selected in accordance with information carried in the diverted portion of the received signal, the optical signal carrying the payload and the control information associated with subsequent nodes in a segment routed path.

Figure 10:
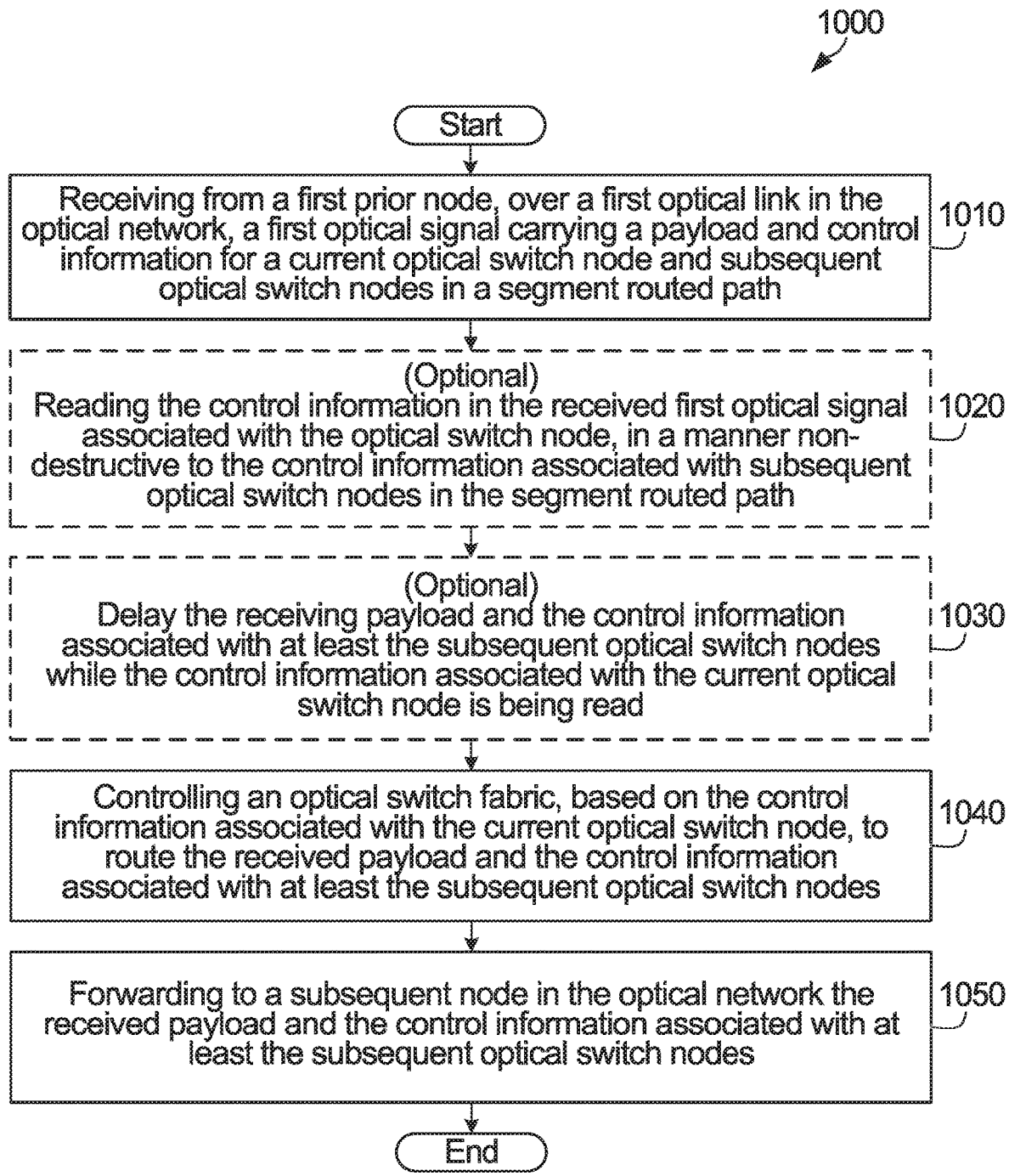
FIG. 10 is a flow chart describing a method for use in an switch node in a segment routed optical network according to an aspect of the disclosure.

A method 1000 for performing segment routing in an optical network will now be described with reference to FIG. 10. The method 1000 can be performed in an optical switch node that is included in a segment routed path of the optical network The method 1000 includes a step 1010 of a current optical switch node receiving from a first prior optical switch node, over a first optical link in the optical network, a first optical signal carrying a payload and control information for the current optical switch node and subsequent nodes in the segment routed path.

Optionally, at step 1020, the optical switch node read the control information in the received first optical signal associated with the current optical switch node, in a manner non-destructive to the control information associated with the subsequent optical switch nodes in the segment routed path. Reading the control information may be done using various different methods. For example, reading the control information may first involve filtering the received signal to extract one or more wavelength channels or tapping the received signal and reading one or more wavelength channels from the tapped signal.

While reading the control information associated with the current optical switch node occurs, the current optical switch node can optionally delay the payload and the control information associated with at least the subsequent optical switch nodes as shown in step 1030. In the scenario in which reading the control information includes tapping the received optical signal, the control information that is delayed may include both the control information associated with the current optical switch node and associated with the subsequent optical switch nodes. In the scenario in which reading the control information includes filtering the received optical signal, the control information that is delayed may include the control information associated with the subsequent optical switch nodes. The control information that traverses the segment routed path may include control information associated with previous optical switch nodes, as well as the current optical switch node and subsequent optical switch nodes. Delaying step 1030 may not need to be performed if the step of reading the control information is fast enough that no significant delay would be incurred in the reading step. Alternatively, possibly a delay could be added in some, but not all, optical switch nodes, so as to avoid an additive effect of a very small reading delay at each node.

At step 1040, the optical switch node controls an optical switch fabric within the optical switch node to route the received payload and the control information associated with at least the subsequent optical switch nodes. The optical switch node is controlled based on the control information associated with the current optical switch node that has been read in step 1020.

At step 1050, the current optical switch node forwards an optical signal carrying the received payload and the control information associated with at least the subsequent optical switch nodes to a subsequent node in the optical network.

In embodiments involving filtering, the received first optical signal is filtered to extract all wavelength channels carrying control information. Then the control information is read from an extracted wavelength channel associated with the optical switch node.

In some embodiments, the method may further include, if control information not associated with optical switch node (i.e. control information associate with subsequent nodes in the path) in the route path has been diverted from the payload, combining wavelength channels carrying control information not associated with the optical switch node with the payload prior to forwarding to the subsequent node the optical signal carrying the received payload and the control information associated with at least the subsequent optical switch nodes in the segment routed path.

In some embodiments, the method may further include receiving from a second prior node over a second optical link in the optical network, a second optical signal carrying a second payload and second control information for all subsequent nodes in a segment routed path, wherein the second control information is on a same wavelength channel as the control information received from the first prior node over the first optical link. The optical switch node controls the switching fabric in accordance with the second control information in the received second optical signal associated with the optical switch node read from the received second optical signal in a manner non-destructive to the control information associated with other nodes in the segment routed path. Then the optical switch node forwards to a subsequent optical switch node in the optical network, through the switching fabric, in a manner determined in accordance with the read second control information, the second optical signal carrying the received payload and the control information associated with subsequent nodes in the optical network.

In some embodiments, the method may further include receiving from a second prior node over a second optical link in the optical network, a second optical signal carrying second payload and second control information, wherein the second control information is on a different wavelength channel than the channel information received from the first prior node over the first optical link. The optical switch node controls the switching fabric in accordance with the second control information in the received second optical signal associated with the optical switch node read from the received second optical signal in a manner non-destructive to the control information associated with other nodes in the segment routed path. Then the optical switch node forwards to a subsequent node in the optical network, through the switching fabric, in a manner determined in accordance with the read second control information, the second optical signal carrying the received payload and the control information associated with subsequent nodes in the optical network.

In some embodiments filtering the received first optical signal to extract the wavelength channel associated with the optical switch node includes a first step of filtering the received first optical signal to drop a first waveband including a plurality of wavelength channels comprising at least one wavelength channel carrying control information associated with the optical switch node and at least one wavelength channel carrying control information not associated with the optical switch node. A second step then includes filtering the dropped first waveband in order to drop the at least one wavelength channel carrying control information associated with the optical switch node and passing the at least one wavelength channel carrying control information not associated with the optical switch node. In some embodiments, the method may further include converting at least a portion of the control information on the dropped at least one wavelength channel carrying control information associated with the optical switch node into an electrical signal for controlling an optical switch fabric in the optical switch node.

In some embodiments reading the control information in the received first optical signal associated with the optical switch node, in a manner non-destructive to the control information associated with other nodes in the segment routed path includes extracting, from the control information in the received optical signal, routing information relevant to the node. In some embodiments forwarding the optical signal in accordance with the read control information associated with the optical switch node includes forwarding the optical signal in accordance with the extracted routing information, without modifying the payload or the control information not relevant to the node.

In some embodiments, the method may further comprise converting at least a portion of the electrical signal including control information not associated with the optical switch node back into an optical signal on a wavelength channel dedicated for control information for all optical switch nodes in the segment routed optical network. Before switching occurs, recombining the optical signal on the dedicated wavelength channel for all optical switch nodes with a through signal remaining from the received optical signal after dropping the at least one wavelength channel associated with the optical switch node. Converting the at least a portion the electrical signal back into an optical signal may comprise converting a portion of the electrical signal that includes a list of optical links or optical switch nodes defining a route in the optical network from the optical switch node to a final destination.

Figure 11:
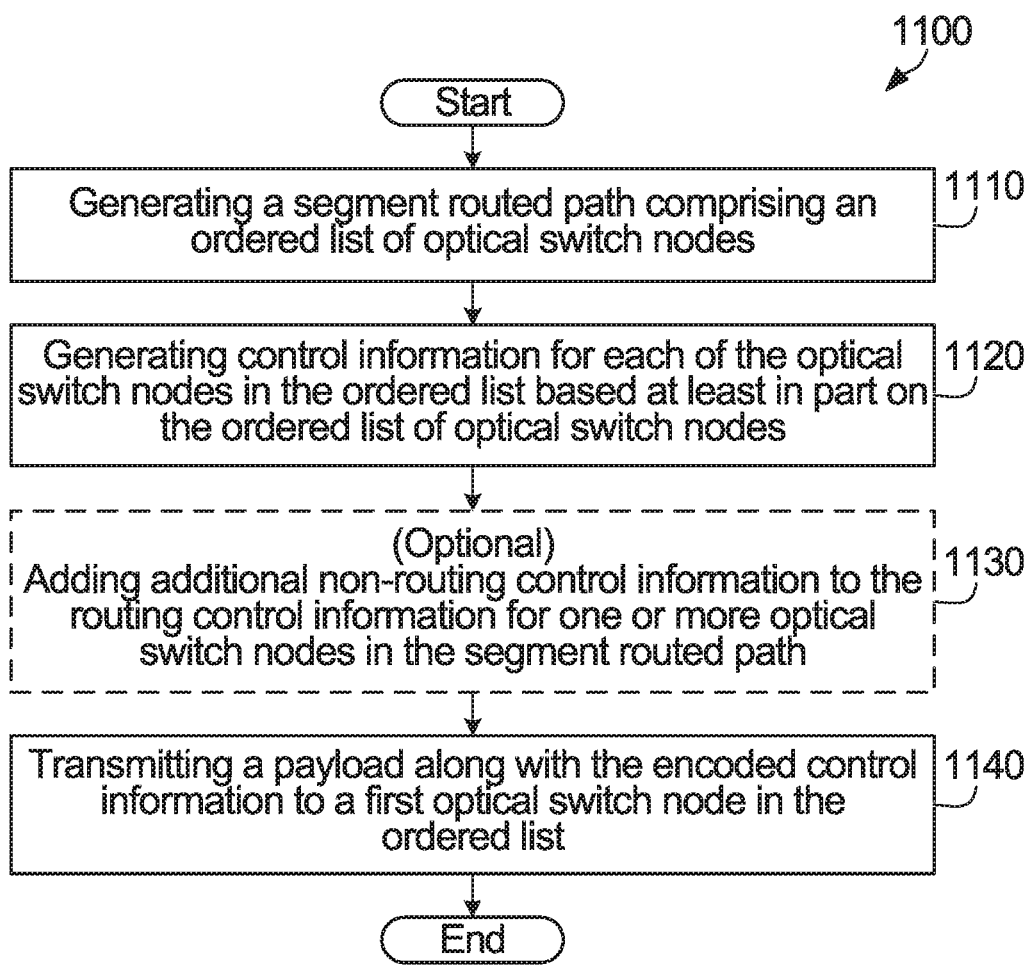
FIG. 11 is flow chart describing a method for use in an optical switch node in a segment routed optical network according to an aspect of the disclosure.

A method 1100 for use in a source node for performing segment routing in an optical network will now be described with reference to FIG. 11. The source node is considered the starting point of a particular segment routed path in the optical network. The source node may be any node in the optical network. The method 1100 includes a step 1110 of generating a segment routed path comprising an ordered list of optical switch nodes. The segment routed path is the path that traffic will traverse through the optical network. In some embodiments, the source node may generate the segment routed path, having a predetermined knowledge of the optical network topology. In other embodiments, a network controller having knowledge of the network topology provides a segment routed path to the source node.

A next step 1120 of the method 1100 includes generating control information for each of the optical switch nodes in the ordered list based at least in part on the ordered list of optical switch nodes.

Optionally, at step 1130, additional non-routing control information may be added to the routing control information for one or more optical switch nodes in the segment routed path. In some embodiments, adding additional non-routing information to the control information includes appending a burst mode reset for a destination node to the control information or at least one of end-to-end and/or source node to intermediate node update and management information to the control information. In a scenario in which a single wavelength channel is used for the transmission of control information for all optical switch nodes, the burst mode reset, update and management information may be encoded on the same wavelength channel as the routing control information. In a scenario in which a different wavelength channel is allocated for transmission of control information for each link of the optical network, the burst mode reset, update and management information is encoded on a same wavelength channel as the routing control information for an optical switch node the additional information is associated with. If there is no additional non-routing information to be added to the routing control information it is to be understood that this step would not occur.

A next step 1140 of the method 1100 includes encoding the generated control information of steps 1120 and 1130 into at least one control wavelength channel. In a scenario in which a single wavelength channel is used for the transmission of the control information for all optical switch nodes, encoding the generated control information into at least one control wavelength channel includes encoding the generated control information into a single wavelength channel. In a scenario in which a different wavelength channel is allocated for transmission of control information for each link of the optical network, encoding the generated control information into at least one control wavelength channel includes encoding the generated control information into a plurality of wavelength channels. Each wavelength channel is encoded with the generated control information for a particular optical link or optical switch node in the segment routed optical network.

In some embodiments, encoding the generated control information into at least one control wavelength channel further includes selecting the one or more wavelength channels for encoding the control information.

A further step 1150 of method 1100 includes transmitting a payload along with the encoded control information to a first optical switch node in the ordered list of the segment routed path. The source node may interface with a higher layer controller, such as a transport SDN controller to obtain information for generating routing information and information regarding source node to intermediate node and/or source node to destination node management and/or updates.

An optical network for segment routing according to the present disclosure can handle flows as small as a few micro-seconds and as large as a circuit connection.

Aspects of the present disclosure may also permit compatibility of a photonic network with software defined networking (SDN) and source-based routing. Flow assignment may be controlled by a main SDN controller to reduce the possibility of bandwidth oversubscription and to reduce contention.

Implementation of a photonic packet switching network according to the disclosure may utilize any one or more of three types of controllers. A first type of controller is a photonic network controller such as an SDN style controller. The photonic network controller controls flow management among the edge (or aggregation) nodes. The edge nodes communicate with such a photonic network controller regarding their traffic status and the controller determines the flows that can be established simultaneously without any contention. The edge nodes are the nodes at the interface between the photonic and electronic domains. Once the flow is determined, the controller provides identification of the photonic segments that each flow can traverse and instructs the edge nodes.

A second type of controller is an edge (or aggregation) node controller. The edge node controller communicates status of traffic destined to other edge nodes to the photonic network controller. The edge node controller also receives commands for flow formulation from the photonic network controller based on segment based routing. The edge node controller determines wavelengths that are used for the control information. For example the edge node controller allocates the wavelengths for encoding routing information, the wavelengths for encoding burst mode reset information, and the wavelengths for encoding other management information.

A third type of controller is a photonic node controller. This is the type of controller that is illustrated in FIGS. 2, 4, 5 and 6. Each node receives an optical signal on a respective port and filters the optical signal to recover a portion of the optical signal on a particular wavelength, the recovered portion being on the same wavelength for all nodes, as in FIGS. 1 and 2, or the recovered portion being on a dedicated wavelength for a given optical link, as in FIGS. 3 and 4. The recovered portion, which is the control information, is passed to node controller. The node could have one or more static wavelength filters such that only a single wavelength is dropped or extracted by each respective filter or one or more tuneable filters that could be dynamically tuned to drop a desired wavelength within the tuneable range, or a mixture of both types of filters. The controller uses the data in the filtered wavelength to extract the routing and management info Benefits of some embodiments of the disclosure may include for example SON control of photonic packet networks by use of segment routing for the flows, a solution to burst frame reset via a control information channel and a deployment of optical packet technology.

Numerous modifications and variations of the present disclosure are possible in light of the above teachings. It is therefore to be understood that within the scope of the appended claims, the disclosure may be practiced otherwise than as specifically described herein.

I claim:

1. A method for operating an optical switch node in a segment routed optical network, the method comprising:
   receiving from a first prior node, over a first optical link in the optical network, a first optical signal carrying a payload on wavelength channels and control information associated with the optical switch node and with subsequent optical switch nodes in a segment routed path, wherein the control information is on a single wavelength channel λ that is dedicated for control information for all optical switch nodes in the segment routed optical network and is a different wavelength channel than the wavelength channels used for the payload, and wherein the control information comprises routing information including a list of optical links or optical switch nodes in the segment routed path, the list defining at least a route from the optical switch node to a destination optical switch node;
   prior to a switching fabric, extracting the control information from the first optical signal by filtering the received first optical signal to drop the single wavelength channel λ carrying the control information and pass the payload, converting the dropped single wavelength channel λ into an electrical signal and reading the control information from the electrical signal to obtain the routing information, determining from the routing information a subsequent node in the optical network to route the first optical signal, converting a portion of the electrical signal including control information not associated with the optical switch node back into an optical signal on the single wavelength channel λ; and
   combining the routing information associated with the subsequent optical switch nodes in the segment routed path back, which is in the converted optical signal on the single wavelength channel λ, together with the received payload in a manner non-destructive to the control information associated with the subsequent optical switch nodes in the segment routed path;
   controlling the switching fabric in accordance with the control information associated with the optical switch node read from the received first optical signal;
   forwarding to the subsequent node in the optical network, through the switching fabric, in a manner determined in accordance with the read control information, an optical signal carrying the combined received payload and the control information associated with the subsequent optical switch nodes in the segment routed path.

2. The method of claim 1 further comprising:
   tapping the received first optical signal; and
   reading the control information from the tapped optical signal.

3. The method of claim 1 further comprising delaying the received first optical signal prior to forwarding while the control information associated with the optical switch node is read.

4. The method of claim 1, wherein the control information further comprises at least one of:
   burst mode reset information; and
   update and/or management information.

5. The method of claim 1 further comprising receiving from a second prior node over a second optical link in the optical network, a second optical signal carrying a second payload and second control information for all subsequent nodes in a segment routed path, wherein the second control information is on a same first wavelength channel as the channel information received from the first prior node over the first optical link, the method further comprising:
   controlling the switching fabric in accordance with the second control information in the received second optical signal associated with the optical switch node read from the received second optical signal in a manner non-destructive to the control information associated with other optical switch nodes in the segment routed path;
   forwarding to a subsequent node in the optical network, through the switching fabric, in a manner determined in accordance with the read second control information, the second optical signal carrying the received payload and the control information associated with subsequent nodes in the optical network.

6. The method of claim 1 further comprising:
   extracting routing information relevant to the optical switch node from the control information in the received optical signal; and
   forwarding an optical signal carrying the received payload and the control information associated with subsequent nodes in the segment routed path without modifying the payload or the control information not relevant to the optical switch node.

7. A method for operating a source node in a segment routed optical network, the method comprising:
   generating a segment routed path comprising an ordered list of optical switch nodes from the source node to a destination node;
   generating control information for each of the optical switch nodes in the ordered list, the control information for controlling a switching fabric of each of the optical switch nodes in the ordered list of optical switch nodes in such a manner that prior to a switching fabric in an optical switch node, the control information is extracted from a received optical signal by filtering the received optical signal to drip a single wavelength channel λ that is dedicated for control information for all optical switch nodes in the segment routed optical network and is a different wavelength channel than wavelength channels used for a payload, converting the dropped single wavelength channel λ into an electrical signal, and reading the control information to obtain the routing information from the electrical signal, a subsequent node in the optical network that the received optical signal to be routed to is determined from the routing information, a portion of the electrical signal including control information not associated with the optical switch node is converted back into an optical signal on the single wavelength channel λ, and the routing information, which is in the converted optical signal on the single wavelength channel λ, associated with subsequent optical switch nodes in the segment routed path is combined back together with the payload received at the optical switch node in a manner non-destructive to the control information associated with the subsequent optical switch nodes in the segment routed path;

encoding the generated control information into the single wavelength channel λ; and transmitting the optical signal payload along with the encoded control information to a first optical switch node in the ordered list.

8. The method of claim 7 wherein the generated control information comprises control information other than routing information for the destination node.

9. The method of claim 7 wherein generating control information for each of the optical switch nodes in the ordered list further comprises appending a burst mode reset for a destination node to the control information.

10. The method of claim 7 wherein generating control information for each of the optical switch nodes in the ordered list further comprises appending at least one of update and management information to the control information.

11. An optical switch node for use in a segment routed optical network comprising:

an input port configured to receive from a prior node in the optical network, over an optical link, an optical signal carrying a payload on wavelength channels and control information for the optical switch node and for subsequent optical switch nodes in a segment routed path, wherein the control information is on a single wavelength channel λ that is dedicated for control information for all optical switch nodes in the segment routed optical network and is a different wavelength channel than the wavelength channels used for the payload;

a wavelength diverter configured to optically divert a portion of the received optical signal thereby filtering the received optical signal including the control information so as to drop the single wavelength channel λ carrying the control information and pass the payload;

an optical-to-electrical converter to convert the dropped single wavelength channel λ including the control information into an electrical signal;

an optical switch fabric optically coupled to the at least one input port configured to route an optical signal carrying the received payload and the control information associated with at least subsequent nodes in a segment routed path to a subsequent node in the optical network; and a controller, optically coupled to the wavelength diverter and the optical switch fabric, the controller configured to control the optical switch fabric to direct, to an output port selected in accordance with information carried in the diverted portion of the received optical signal, wherein prior to the optical switch fabric, the controller is configured to:

read the control information from the electrical signal to obtain the routing information from the electrical signal; and determine from the routing information, which is part of the electrical signal, a subsequent node in the optical network to route the optical signal; and an electrical-to-optical converter to convert the routing information associated with the subsequent optical switch nodes in the segment routed path, which is in the converted optical signal, back into an optical signal on the single wavelength channel λ;

a wavelength combiner configured to optically combine the optically converted routing information on the single wavelength channel λ back together with the received payload in a manner non-destructive to the control information associated with the subsequent optical switch nodes in the segment routed path.

12. The optical switch node of claim 11 wherein the controller is configured to:

read control information associated with the optical switch node in the diverted portion of the received optical signal in a manner non-destructive to the control information associated with other nodes in the segment routed path;

control the optical switch fabric to route the optical signal in accordance with the read control information associated with the optical switch node.

13. The optical switch node of claim 11 wherein the wavelength diverter comprises:

at least one optical filter, each optical filter optically coupled to one or more of the at least one input port and the controller, the at least one optical filter configured to filter the received optical signal to extract the single wavelength channel associated with the optical switch node; and wherein the controller reads the control information associated with the optical switch node from the extracted single wavelength channel.

14. The optical switch node of claim 11 wherein the wavelength diverter comprises:

an optical splitter, the optical splitter optically coupled to one or more of the at least one input port and the controller, the optical splitter configured to tap the received optical signal; and wherein the controller reads the control information associated with the optical switch node from the tapped optical signal.

15. The optical switch node of claim 11 further comprising a delay element configured to delay the received optical signal prior to routing while the control information associated with the optical switch node is read.

16. The optical switch node of claim 11, wherein the control information comprises at least one of:

burst mode reset information; and update and/or management information.

17. A source node for use in a segment routed optical network comprising:

a controller configured to:

generate a segment routed path through the optical network comprising an ordered list of optical switch nodes;

generate control information for each of the optical switch nodes in the ordered list, the control information for controlling a switching fabric of each of the optical switch nodes in the ordered list of optical switch nodes in such a manner that prior to a switching fabric in an optical switch node, the control information is extracted from a received optical signal by filtering the received optical signal to drop a single wavelength channel λ that is dedicated for control information for all optical switch nodes in the segment routed optical network and is a different wavelength channel than wavelength channels used for a payload, converting the dropped single wavelength channel λ into an electrical signal, and reading the control information to obtain the routing information from the electrical signal, a subsequent node in the optical network that the received optical signal to be routed to is determined from the routing information, which is part of the electrical signal, a portion of the electrical signal including control information not associated with the optical switch node is converted back into an optical signal on the single wavelength channel λ, and the routing information, which is in the converted optical signal on the single wavelength channel λ, associated with subsequent optical switch nodes in the segment routed path is combined back together with the payload received at the optical switch node in a manner non-destructive to the control information associated with the subsequent optical switch nodes in the segment routed path;

encode the generated control information into the single wavelength channel λ; and transmit the payload along with the encoded control information to a first optical switch node in the ordered list.

18. The source node of claim 17 wherein the controller is configured to further append at least one of:

a burst mode reset to the control information; and update and/or management information to the control information.

* * * * *

UNITED STATES PATENT AND TRADEMARK OFFICE
CERTIFICATE OF CORRECTION

PATENT NO. : 10,750,255 B2  
APPLICATION NO. : 15/136378  
DATED : August 18, 2020  
INVENTOR(S) : Hamid Mehrvar Page 1 of 1

It is certified that error appears in the above-identified patent and that said Letters Patent is hereby corrected as shown below:

In the Claims

At Column 22, Line 51, Claim 7:
"received optical signal to drip a single wavelength"
Should be:
-- received optical signal to drop a single wavelength --

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*